United States Patent [19]
Potter et al.

[11] Patent Number: 5,643,485
[45] Date of Patent: Jul. 1, 1997

[54] COOKING UTENSIL WITH IMPROVED HEAT RETENTION

[75] Inventors: Thomas F. Potter, Denver; David K. Benson; Steven D. Burch, both of Golden, all of Colo.

[73] Assignee: Midwest Research Institute, Kansas City, Mo.

[21] Appl. No.: 343,081

[22] Filed: Nov. 21, 1994

Related U.S. Application Data

[63] Continuation-in-part of Ser. No. 194,932, Feb. 12, 1994, Pat. No. 5,562,154, and Ser. No. 194,933, Feb. 12, 1994, Pat. No. 5,433,056, each is a division of Ser. No.960,885, Oct. 14, 1992, Pat. No. 5,318,108, which is a continuation-in-part of Ser. No. 856,840, Mar. 23, 1992, Pat. No. 5,175,975, which is a continuation of Ser. No. 181,926, Apr. 15, 1988, abandoned, said Ser. No. 960,885, is a continuation-in-part of Ser. No. 535,782, Jun. 12, 1990, Pat. No. 5,157,893, which is a continuation-in-part of Ser. No. 181,926.

[51] Int. Cl.$^6$ .............................. H05B 6/12; A47G 23/04
[52] U.S. Cl. ...................... 219/621; 219/625; 219/651; 219/430; 219/439; 126/375; 126/390; 99/DIG. 14; 220/422
[58] Field of Search .................... 219/621, 625, 219/439, 440, 430, 730, 601, 651; 126/374, 375, 390; 99/DIG. 14; 220/422, 424, 912, 420, 421, 425

[56] References Cited

U.S. PATENT DOCUMENTS

| | | |
|---|---|---|
| 1,239,770 | 9/1917 | Coleman . |
| 1,493,459 | 5/1924 | Jancikin . |
| 1,555,484 | 9/1925 | Rosenberg . |
| 1,770,200 | 7/1930 | Comstock . |
| 1,961,643 | 6/1934 | Roth ............................. 126/221 |
| 2,173,815 | 9/1939 | Slisz et al. ...................... 154/28 |
| 2,221,309 | 11/1940 | Gazelle ........................... 154/45 |
| 2,233,190 | 2/1941 | Amorosi .......................... 20/4 |
| 2,820,134 | 1/1958 | Kobayashi ........................ 126/374 |

(List continued on next page.)

FOREIGN PATENT DOCUMENTS

| | | |
|---|---|---|
| 0 047 725 B1 | 12/1985 | European Pat. Off. . |
| 3618976 A1 | 2/1987 | Germany . |
| 197804 | 3/1976 | Switzerland . |
| 683855 | 12/1952 | United Kingdom . |
| 2 079 415 | 1/1982 | United Kingdom . |

OTHER PUBLICATIONS

Report entitled "Development & Testing of Vacuum Super Insulation for Use in Residential and Industrial Construction" by Kurt Reinhard of ERNO Space Technology GmbH, Bremen, West Germany, Mar. 1977.
German—ERNO Raumfahrttechnik GmbH Technical Paper 309 (undated and no author available.).

Primary Examiner—Philip H. Leung
Attorney, Agent, or Firm—Edna M. O'Connor; Ken Richardson

[57] ABSTRACT

A cooking utensil with improved heat retention includes an inner pot received within an outer pot and separated in a closely spaced-apart relationship to form a volume or chamber therebetween. The chamber is evacuated and sealed with foil leaves at the upper edges of the inner and outer pot. The vacuum created between the inner and outer pot, along with the minimum of thermal contact between the inner and outer pot, and the reduced radiative heat transfer due to low emissivity coatings on the inner and outer pot, provide for a highly insulated cooking utensil. Any combination of a plurality of mechanisms for selectively disabling and re-enabling the insulating properties of the pot are provided within the chamber. These mechanisms may include: a hydrogen gas producing and reabsorbing device such as a metal hydride, a plurality of metal contacts which can be adjusted to bridge the gap between the inner and outer pot, and a plurality of bimetallic switches which can selectively bridge the gap between the inner and outer pot. In addition, phase change materials with superior heat retention characteristics may be provided within the cooking utensil. Further, automatic and programmable control of the cooking utensil can be provided through a microprocessor and associated hardware for controlling the vacuum disable/enable mechanisms to automatically cook and save food.

58 Claims, 10 Drawing Sheets

U.S. PATENT DOCUMENTS

| | | | |
|---|---|---|---|
| 2,989,156 | 6/1961 | Brooks et al. | 189/34 |
| 3,151,365 | 10/1964 | Glaser et al. | 20/4 |
| 3,151,712 | 10/1964 | Jackson | 189/34 |
| 3,152,033 | 10/1964 | Black et al. | 161/50 |
| 3,161,265 | 12/1964 | Matsch et al. | 189/34 |
| 3,167,159 | 1/1965 | Bovenkerk | 189/34 |
| 3,179,549 | 4/1965 | Strong et al. | 161/43 |
| 3,321,826 | 5/1967 | Lowy | 29/423 |
| 3,362,467 | 1/1968 | Kummerer | 165/86 |
| 3,424,622 | 1/1969 | Dechert | 136/161 |
| 3,450,196 | 6/1969 | Bauer | 165/32 |
| 3,525,663 | 8/1970 | Hale | 161/68 |
| 3,565,671 | 2/1971 | Teeg et al. | 117/71 |
| 3,578,068 | 5/1971 | Elliott et al. | 165/39 |
| 3,647,606 | 3/1972 | Notaro | 161/52 |
| 3,745,290 | 7/1973 | Harnden, Jr. et al. | 219/621 |
| 3,777,094 | 12/1973 | Peters, Jr. | 219/10.49 |
| 3,830,288 | 8/1974 | Laing | 165/32 |
| 3,903,011 | 9/1975 | Donnelly | 252/188.3 |
| 3,968,831 | 7/1976 | Xenophou | 165/1 |
| 3,979,572 | 9/1976 | Ito et al. | 219/621 |
| 4,111,689 | 9/1978 | Liu | 75/122 |
| 4,129,767 | 12/1978 | Amagami | 219/626 |
| 4,137,964 | 2/1979 | Buckley | 165/1 |
| 4,235,956 | 11/1980 | Gross et al. | 429/112 |
| 4,244,980 | 1/1981 | Buchner | 165/32 |
| 4,270,329 | 6/1981 | Moore | 52/576 |
| 4,304,294 | 12/1981 | Reisman et al. | 165/32 |
| 4,327,162 | 4/1982 | Borger | 429/120 |
| 4,383,013 | 5/1983 | Bindin et al. | 429/112 |
| 4,444,821 | 4/1984 | Young et al. | 428/69 |
| 4,468,423 | 8/1984 | Hall | 428/72 |
| 4,477,486 | 10/1984 | Boaz | 427/54.1 |
| 4,486,482 | 12/1984 | Kobayashi et al. | 428/69 |
| 4,505,252 | 3/1985 | Wada et al. | 126/246 |
| 4,576,842 | 3/1986 | Hartsing et al. | 428/35 |
| 4,683,154 | 7/1987 | Benson et al. | 428/34 |
| 4,770,004 | 9/1988 | Lagodmos | 62/383 |
| 4,809,352 | 2/1989 | Walker | 206/522 |
| 4,810,553 | 3/1989 | Lombardozzi | 428/116 |
| 4,900,884 | 2/1990 | Aoki | 219/601 |
| 5,028,474 | 7/1991 | Czaplicki | 428/178 |
| 5,051,322 | 9/1991 | Hasenauer | 429/120 |
| 5,117,809 | 6/1992 | Scaringe et al. | 126/263 |
| 5,125,391 | 6/1992 | Srivastava et al. | 126/246 |
| 5,158,759 | 10/1992 | Marinescu-Pasoi et al. | 423/658.2 |
| 5,318,108 | 6/1994 | Benson et al. | 165/32 |

…

COOKING UTENSIL WITH IMPROVED HEAT RETENTION

CROSS-REFERENCE TO RELATED PATENT APPLICATIONS

This patent application is a continuation-in-part of U.S. patent application, Ser. No. 08/194,932 filed on Feb. 12, 1994 U.S. Pat. No. 5,562,154 and U.S. patent application, Ser. No. 08/194,933, also filed on Feb. 12, 1994, U.S. Pat. No. 5,433,056, each of which is a divisional application of U.S. patent application, Ser. No. 07/960,885 filed on Oct. 14, 1992 (now U.S. Pat. No. 5,318,108), which is a continuation-in-part of U.S. patent application, Ser. No. 07/856,840 filed on Mar. 23, 1992 (now U.S. Pat. No. 5,175,975), which is a continuation of U.S. patent application, Ser. No. 07/181,926, filed on Apr. 15, 1988, now abandoned, and U.S. patent application, Ser. No. 07/960,885 is also a continuation-in-part of U.S. patent application Ser. No. 07/535,782, filed on Jun. 12, 1990 (now U.S. Pat. No. 5,157,893), which is a continuation-in-part of U.S. patent application Ser. No. 07/181,926 filed on Apr. 15, 1988, now abandoned.

CONTRACTUAL ORIGIN OF THE INVENTION

The United States Government has rights in this invention under Contract No. DE-AC36-83CH10093 between the U.S. Department of Energy and the National Renewable Energy Laboratory, a Division of Midwest Research Institute.

BACKGROUND OF THE INVENTION

1. Field of the Invention

This invention relates to a method and apparatus for improving the thermal performance of a cooking utensil, and more particularly to a cooking utensil which may be selectively controlled to vary the thermal conductance and insulating characteristics thereof.

2. Description of the Prior Art

Cookware for domestic and commercial food preparation has been relatively unchanged for the past thirty years. Nevertheless, food preparation personnel continue to require cooking utensils which prevent or reduce the chances of overcooking, scorching, or burning food by evenly distributing the heat across the entire cooking surface of the utensil and by thermostatically controlling the cooking temperature thereof. In addition, cooking utensils and/or food-serving containers with an improved ability to retain heat are required.

To evenly distribute the heat, cookware manufacturers have experimented with different cookware materials including ceramics and metals such as stainless steel, aluminum, and copper. More particularly, laminates with combinations of these materials have been used. In addition, double-boilers have been developed which include both an inner and an outer cooking vessel, the inner vessel being surrounded by a bath of boiling water or steam within the outer cooking vessel. Double-boilers suffer from the disadvantages of eventual boil-off of all of the water within the outer vessel, thereby losing the thermal constraint as well as the eventual build up of mineral deposits from the evaporated water. Further, double-boilers have excessive weight and maximum cooking temperatures in the inner vessel which are only as high as the boiling temperature of the water. Similarly, U.S. Pat. No. 1,493,459 issued to Jancikin discloses a cooking utensil similar to a double-boiler into which water or oil may be placed into the outer cooking vessel.

U.S. Pat. No. 1,555,484 issued to Rosenberg discloses a cooking utensil with a layered arrangement including a heat-receiving plate below a heat-distributing plate which, in turn, is below a cooking surface of the utensil. The heat-distributing plate is of a relatively high conductivity material such as copper which may be corrugated or formed with a series of air cells.

U.S. Pat. No. 1,961,643 issued to Roth discloses a cooking plate having a pair of parallel upper and lower surfaces. The lower surface is exposed to a source of heat and the upper surface receives a cooking utensil. Located between the upper and lower plates is a filling of gravel, silica, sand, cement, soapstone, crushed lava or other siliceous material which distributes the heat evenly therein and to the upper cooking surface.

In order to thermostatically control the cooking surface of a utensil, electric skillets and crockpots have been developed. Typically, their heating element is embedded below the bottom surface of the utensil to adequately mask the heating element below or within the metal or ceramic mass of the utensil. This masking tends to avoid excessive local overheating. The disadvantages of such devices include increased cost, weight, and complexity. Further, these devices tend to gradually develop zones on the cooking surface which are effected by the heat and which change their cooking characteristics over time. In addition, the use of electricity for temperature maintenance is wasteful and costly. Finally, the electric cord and connector associated with these devices introduces the disadvantages of safety hazards, nuisance, functional obsolescence, and cleaning problems.

In order to better retain heat within cooking utensils after cooking, lids have traditionally been used. Nevertheless, utensils with lids tend to lose heat rapidly through their exterior surfaces by the processes of radiation, conduction and convection of heat. As a consequence, the most common solution is to continue to apply heat to the cooking utensil in some manner. This may include leaving the cooking utensil on the burner of a stove or range. Even with the burner adjusted to a minimum position, the prepared food may become dried out, burnt, or otherwise overcooked with time.

As an alternative, the cooking utensil may be placed on a food warmer such as is disclosed in Swiss Patent CH197804 which relates to a heat-retaining plate warmer including a hollow volume defined therein which contains a solid calorific material for retaining heat. The calorific material is solid at room temperature and retains heat over a relatively long time period when heated to a liquid state.

U.S. Pat. No. 5,125,391 issued to Srivastava et al. discloses a heat-retaining food service container with an outer shell and an expandable inner shell arrangement. Contained within the inner shell is a mass of heat-fusible material which expands when heated. The expandable inner shell thus expands or deforms as necessary to contain the material therein.

An insulated cooking utensil for retaining heat within the cooking utensil is disclosed in U.S. Pat. No. 3,777,094 issued to Peters, Jr. The utensil includes a metallic inner container for containing and cooking the food therein. Surrounding the metallic inner container are two layers of exterior insulating layers, which may be composed of high temperature plastic, ceramic, high temperature glass or the like. Each of the exterior insulating layers include a window opening defined along a bottom surface thereof to allow heat to be applied to the metallic inner container through high frequency magnetic induction fields.

SUMMARY OF THE INVENTION

Accordingly, it is an object of the present invention to provide a cooking utensil which is self-insulating to hold heat within the utensil so as to maintain the prepared food at the desired temperature.

It is also an object of the present invention to provide a cooking utensil which distributes the heat applied thereto evenly across the cooking surface.

It is further an object of the present invention to provide a cooking utensil which limits the maximum temperature of the cooking surface.

It is still further an object of the present invention to provide a cooking utensil in which the cooking surface can be thermostatically controlled.

It is still further an object of the present invention to provide a cooking utensil in which the inner surfaces and the food contained therein are maintained at a desired relatively warm temperature while the exterior surfaces are cooled to ambient temperature.

It is still further an object of the present invention to provide a cooking utensil in which food cooking, heating, and heat holding practices can be intelligently monitored and controlled, based on decision making capabilities of microprocessor technology.

It is still further an object of the present invention to provide a cooking utensil with the capability of replicating cycles of cooking, heating and heat holding of thermally sensitive material.

It is still further an object of the present invention to provide a cooking utensil with the capability of replicating cycles of cooking, heating, and heat holding that have been practiced on other cooking utensils at other times.

It is still further an object of the present invention to provide a cooking utensil with the capability of modifying learned cycles of cooking, heating, and heat holding depending on cook preference, altitude, or any other factor.

It is still further an object of the present invention to provide a cooking utensil with the capability of recording cycles of cooking, heating, and heat holding for transfer to and use by other similarly "smart" cooking utensils at other times.

Additional objects, advantages, and novel features of the invention shall be set forth in part in the description that follows, and in part will become apparent to those skilled in the art upon examination of the following specification or may be learned by the practice of the invention. The objects and the advantages of the invention may be realized and attained by means of the instrumentalities, combinations and methods particularly pointed out in the appended claims.

To achieve the foregoing and other objects and in accordance with the purposes of the present invention, as embodied and broadly described herein, this invention addresses the problems of rapid heat loss when cooking utensils are removed from the heat source which consequently results in cold food and/or localized over-heating as heat is introduced through relatively small heating zones to replace the lost heat. The hot outer surface can also cause damage to surfaces on which it rests and presents a safety hazard. This invention solves these problems by providing a utensil with a double-shelled construction incorporating a vacuum insulation, and provides means for controlling the heat flow between the spaced-apart walls of the shell. For cooking, the vacuum insulation can be reversibly disabled when the temperature of the outside surface reaches a preset value, the vacuum insulation otherwise being highly insulating. In the insulating mode, which is partially operative as a thermal input control mechanism, and is fully operative when the utensil is removed from the heat source, the vacuum insulation greatly slows the loss of heat and prevents the outside surface from remaining dangerously hot. The mechanism for varying thermal conductance across the vacuum insulation can include a metal hydride source of hydrogen mounted within the insulation and thermally connected to the outer wall. When the temperature of the outer wall is raised to a certain predetermined point, the hydride will be heated to reversibly release the hydrogen gas into the vacuum space, making it thermally conductive. When the hydride is allowed to cool, it reabsorbs the hydrogen gas and re-establishes the thermally insulating high vacuum.

BRIEF DESCRIPTION OF THE DRAWINGS

The accompanying drawings, which are incorporated in and form a part of the specifications, illustrate the preferred embodiments of the present invention, and together with the descriptions serve to explain the principles of the invention.

In the Drawings.

DETAILED DESCRIPTION OF THE PREFERRED EMBODIMENT

Figure 1:
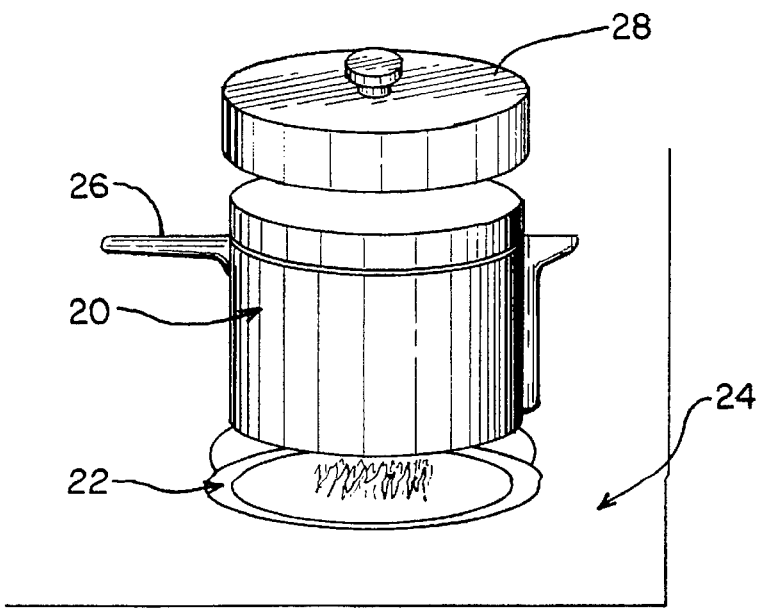
FIG. 1 is a perspective view of a cooking utensil or pot of the present invention shown on a gas burner of a stove.
Figure 2:
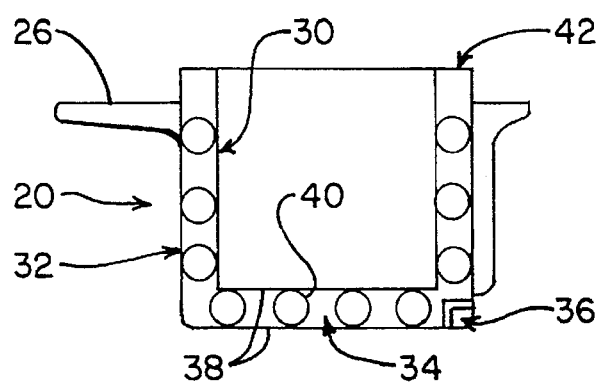
FIG. 2 is a cross-sectional view of the cooking pot shown in FIG. 1, illustrating the inner pot and outer pot and the chamber formed therebetween.

The cookware of the present invention includes a dynamic vacuum insulation pot 20 as shown in FIG. 1 on a gas burner 22 of a stove 24. The cooking pot 20 is provided with a handle 26 and an insulating lid 28. The cooking pot 20 includes an inner pot, shell, or cooking vessel 30 (FIG. 2) within an outer pot or shell 32. The volume or chamber 34 defined between the inner pot 30 and the outer pot 32 is evacuated. A mechanism 36 for selectively disabling or re-enabling the insulation or vacuum is provided within the volume 34.

In the description that follows, the vacuum insulation technology will first be discussed, followed by a discussion of the various disabling mechanisms, the manual adjustment of the amount of the insulation, heat retention materials, automatic and programmable adjustments of the amount of insulation, and cooking and food preparation examples using the pot 20 of the present invention.

Vacuum Insulation

Figure 3:
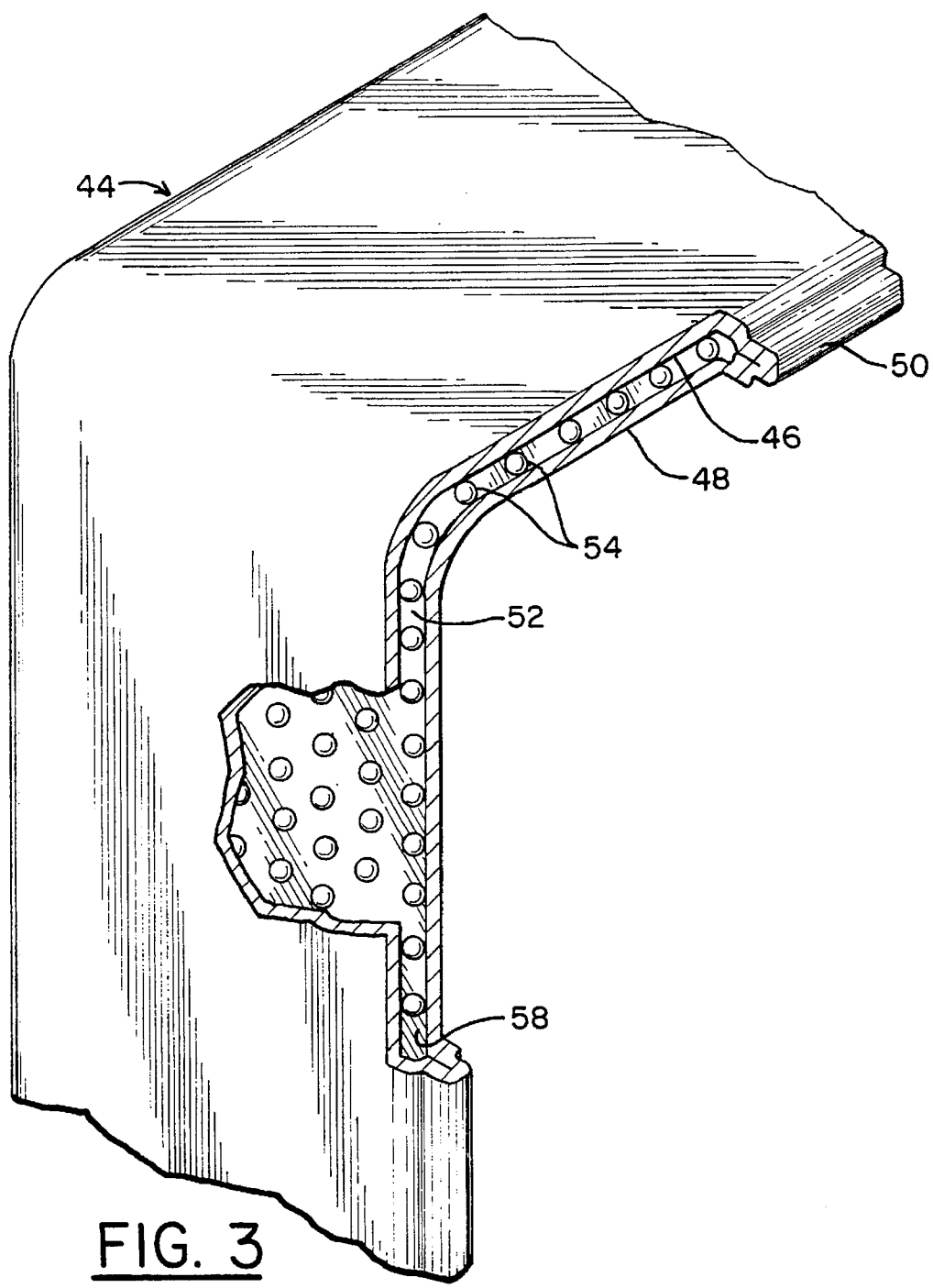
FIG. 3 is a perspective view of a pair of walls separated by spacers to illustrate the compact vacuum insulation technology incorporated in the present invention.
Figure 4:
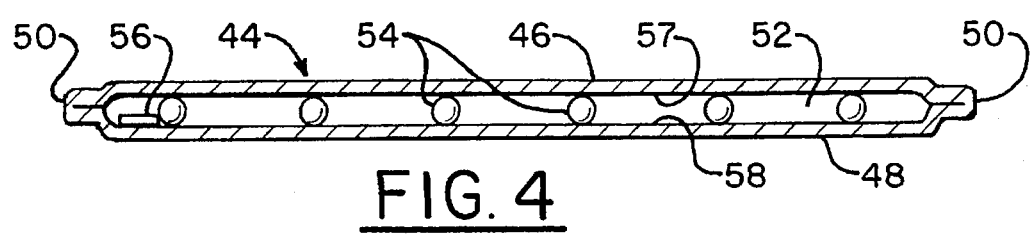
FIG. 4 is a cross-sectional view of the wall and spacer arrangement shown in FIG. 3.

The basic concepts of vacuum insulation technology are disclosed in two of our previous patents, U.S. Pat. No. 5,157,893 entitled "Improved Compact Vacuum Insulation" and U.S. Pat. No. 5,175,975 entitled "Compact Vacuum Insulation", each of which are incorporated herein by reference. Generally, compact vacuum insulation includes a pair of spaced-apart metallic walls with glass or ceramic spacers placed therebetween, as discussed below and shown in FIGS. 3 and 4. The metallic walls are joined by metal-to-metal welds as is also shown in FIGS. 3 and 4. Alternatively, the metallic walls may be joined by a foil member as discussed in further detail below. The purpose of the welds or foil is to seal and enclose the chamber 34 (FIG. 2) defined between the inner and outer pots 30 and 32, respectively. The enclosed chamber 34 is evacuated to a level sufficient to significantly reduce heat transfer therethrough as discussed below in greater detail.

Figure 5:
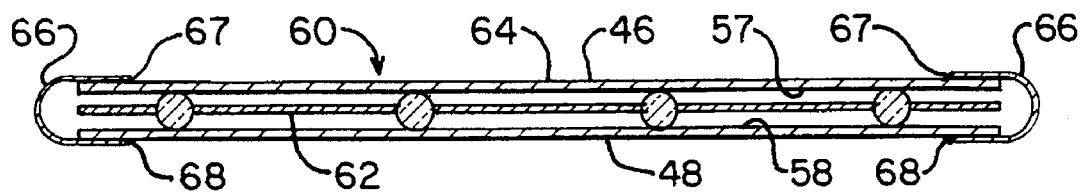
FIG. 5 is a cross-sectional view of a compact vacuum insulation panel with alternate web and nodule spacers in a foil edged seal.

Specifically, compact vacuum insulation, for purposes of describing the embodiments of this invention is preferably, although not necessarily, an ultra-thin insulation panel 44, as illustrated in FIGS. 3 and 4. The compact vacuum insulation panel 44 is preferably constructed with two metal sidewalls 46, 48 positioned in parallel, closely spaced relation to each other and sealed at the edges by metal-to-metal welds 50 to enclose a space or vacuum chamber 52. In some applications, especially for smaller panels 60, as illustrated in FIG. 5, it may be beneficial to provide thinner metal foil leaves 66 at the joints between the edges of the sidewalls 46, 48, but still utilizing metal-to-metal welds 67, 68 to make the seals. Such thinner foil leaves 66 can inhibit heat transfer from one sidewall 46 to the other sidewall 48 around their edges more than the direct metal-to-metal welds 50 of panel embodiment 44 in FIGS. 3 and 4.

Glass, ceramic, fused quartz, porcelain-coated metal, or other glass-like spacers 54 are positioned at spaced intervals between the sidewalls 46, 48 to hold them apart when the space of chamber 52 is evacuated. The spacers 54 can be discrete spherical beads, as illustrated in FIGS. 3 and 4, or they can be nodules 64 protruding from webs 62, as illustrated in the panel 60 in FIG. 5. The webs 62 can be the same material as the nodules 64, such as glass, ceramic, or other glass-like materials, or they can be metal mesh with glass-like beads or porcelain-coated metal spacers functioning as protrusions or nodules 64. A getter material 56 may be included, as shown in FIG. 4, to absorb and withdraw extraneous gaseous molecules from the chamber 52.

The thinner foil leaves 66 do not necessarily have to be used with the web 62 and nodules 64 or vice versa. Those are independent alternatives that are both illustrated in the embodiment 60 of FIG. 5 for convenience only.

Other suitable spacer structures, methods of fabrication, preferred parameters, and alternate embodiments can be found in two co-pending U.S. patent applications, Ser. Nos. 07/181,926 and 07/535,782 and in U.S. Pat. No. 5,107,649, all of which are incorporated by reference herein. However, the important combination of features to obtain effective compact vacuum insulation according to this invention include: (1) The thin and hard but bendable metal sidewalls 46, 48 closely spaced together; (2) glass or glass-like spacers 54 or nodules 64 that not only have low thermal conductivity, but also do not evolve gases, like plastics and other materials would; (3) the glass or glass-like spacers 54 or nodules 64 are discrete objects in spaced-apart relation, not powders or fibers that would trap gases, provide more thermal conductivity, and interfere with the leak-proof integrity of welded seals; (4) the spacers 54 or nodules 64 are rounded or pointed to provide "point" or "near point" contact, not flat surface contact, with the wall sheets 46, 48 or each other; (5) the vacuum in the space or chamber 52 is sufficient to meet the criteria of having the mean free path between molecular collisions greater than the distance between wall sheets 46, 48, preferably lower than $10^{-5}$ torr, and ideally at least $10^{-6}$ torr; (6) the edge seals 50 are metal-to-metal welds that can seal the vacuum for twenty years or longer, not plastics, glass, adhesives, or clamp strips that leak or evolve gases enough to disable the insulative effect in a short time or need intermittent re-evacuation; and (7) low emissivity surfaces or surface coatings 57, 58 on the sidewalls 46, 48 and/or on the radiative shields.

Figure 6:
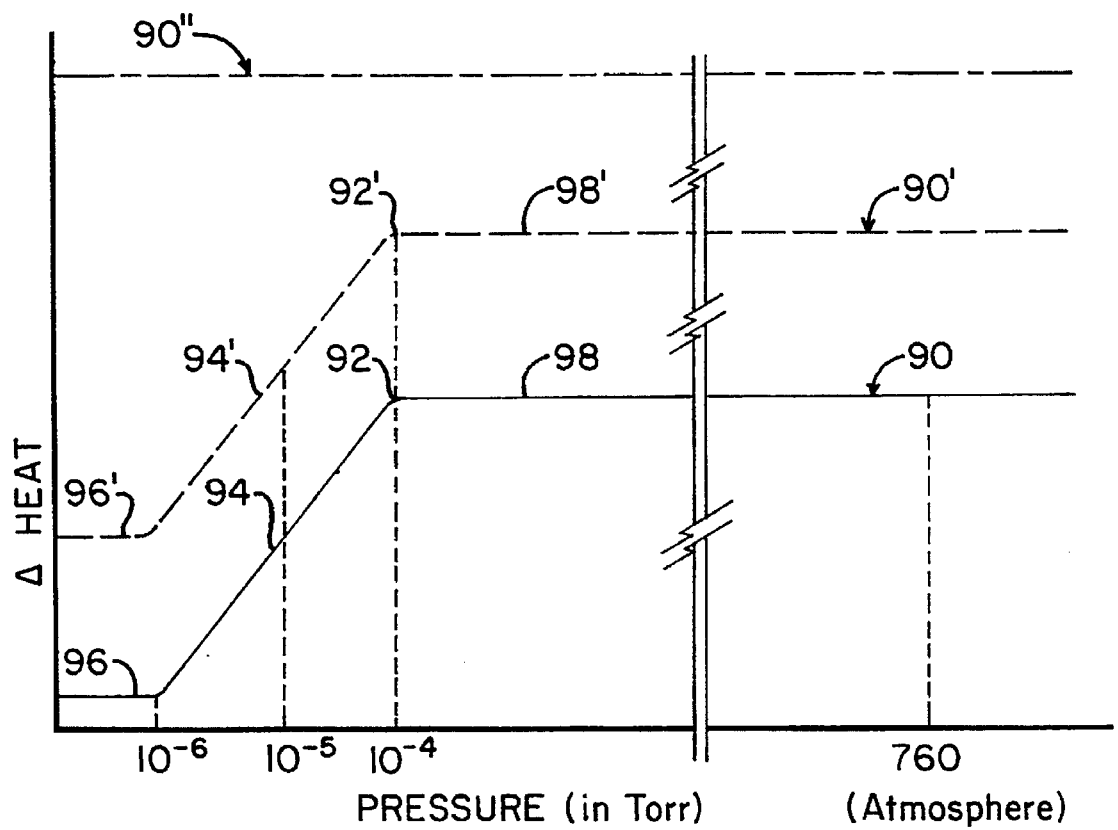
FIG. 6 is a graphical representation of the insulation effectiveness of compact vacuum insulation against heat transfer as effected by variations in gas pressure, variations in emissivity, and metal-to-metal contacts alone and in relation to each other.

When the space or chamber 52 between the sidewalls 46, 48 is evacuated, heat transfer across the panels 44, 60 can be substantially inhibited. The extent of the vacuum in relation to the distance between the sidewalls 46, 48 can determine the relative amount or rate of heat transfer. Referring to FIG. 6, the rate of heat transfer, $\Delta$ HEAT, is graphed in log relation to gas pressure, PRESSURE (in torr), for ultra-thin insulation according to this invention, where the spacing between sidewalls 46, 48 is preferably in the range of about 2 to 5 mm but practically about 0.5 to 20 min. Essentially, when the vacuum in chamber 52 is sufficient to maintain the gas pressure at about $10^{-6}$ torr or less, the heat transfer across the panel 44 continues at a more or less substantially constant rate, as shown by the portion 96 of the curve 90 in FIG. 6, regardless of additional pressure drop. In that vacuum range the heat transfer is dominated almost entirely by the heat transfer mechanisms of infrared radiation across chamber 52 and conduction through the spacers 54, neither of which heat transfer mechanisms is affected significantly by gas pressure. The exact gas pressure at which this overriding domination of heat transfer by radiation across chamber 52 and by conduction through spacers 54 occurs depends not only on the distance between sidewalls 46, 48, but also on the temperature. In general, the hotter the temperature, the more heat transfer will tend to be dominated by radiation. However, for insulation panels 44, 60 constructed according to the description above, that effect occurs in the range of about $10^{-6}$ torr. Therefore, as illustrated by the portion 96 of the curve 90, decreasing the gas pressure below about $10^{-6}$ torr does not increase the effective insulation function of the panel 44, 60. Increasing the gas pressure above $10^{-6}$ torr, however, does decrease the insulative effect of the panel 44, 60.

As the gas pressure is raised above $10^{-6}$ torr, the heat transfer across the insulation panel 44 increases in a fairly linear manner, as shown by the portion 94 of the curve 90 in FIG. 6. This increase in heat transfer results from having more gas molecules available in chamber 52 to conduct heat energy from one sidewall 46 to the other sidewall 48, or vice versa, in sufficient quantities to add to the heat transfer that occurs by radiation and conduction through spacers 54. The linear relationship between increase in gas pressure above about $10^{-6}$ torr and the resulting increase in heat transfer, as shown by the portion 94 of the curve 90 in FIG. 6, indicates that with more gas molecules available in the chamber 52 to conduct heat, more heat will be conducted from one sidewall 46 or 48 to the other. However, when the gas pressure in the chamber 52 increases to about $10^{-4}$ torr ($10^{-7}$ atmospheres) there is a pronounced bend 92 in the curve 90 in FIG. 6 to essentially a flat line portion 98, where increase in gas pressure does not result in a corresponding, in fact any, significant increase in heat transfer. The area of the bend 92 at about $10^{-4}$ torr is where there are sufficient gas molecules in the chamber 52 such that the mean free path between the molecules is about equal to the distance between the sidewalls 46, 48. Consequently, to obtain any beneficial increase in insulating effect from the enclosed chamber 52 over an enclosed chamber with air or other gas at normal atmospheric pressure (760 torr), the vacuum has to be at least sufficient to remove enough gas molecules so that the mean free path between collisions of the molecules is greater than the distance between the sidewalls 46, 48, which occurs at about $10^{-4}$ torr for the ultra-thin compact vacuum insulation according to this invention.

If the low emissivity coatings 57, 58 on the sidewalls 46, 48 were eliminated, the resulting heat transfer would be increased by the resulting increase in radiation from one sidewall 46 or 48 to the other, as indicated by the curve 90' in FIG. 6. Essentially, all of the portions 92, 94, 96, and 98 of curve 90 remain in substantially the same relation to each other in the resulting curve 90', as indicated at 92', 94', 96' and 98', except that the actual heat transfers at those portions are higher by the amount of the increased radiation that occurs without the low emissivity coatings.

On the other hand, a metal-to-metal contact between the sidewalls 46, 48 is such an effective heat conductor that it causes the insulation effect of the panel 44 to be virtually eliminated in the vicinity of the metal-to-metal contact, regardless of the extent of the vacuum in chamber 52 and regardless of the presence or absence of the emissivity coatings 57, 58. The effect of such a metal-to-metal contact on heat transfer between the sidewalls 46, 48 in relation to vacuum or gas pressure and emissivity is illustrated by the curve 90" in FIG. 6. It is so effective at eliminating resistance to thermal transfer across the compact vacuum insulation that it can be considered analogous from a thermal perspective to a short circuit in an electrical context, i.e., a thermal short circuit, or sometimes simply referred to herein as a "thermal short."

The dynamic or changeable compact vacuum insulation according to this invention varies the resistance to heat flow between sidewalls 46, 48 by varying one or more of the mechanisms described above, i.e., molecular or gas conduction, radiation or emissivity, and metal-to-metal contact or thermal short. The variation in gas conduction varies heat transfer along the portion 94 of curve 90 in FIG. 6, while the variation in emissivity or radiation varies heat transfer between the curves 90 and 90'. The metal-to-metal contact or thermal short, on the other hand, varies heat transfer from either curve 90 or 90', or from anywhere between curves 90 and 90', to curve 90", as will be described in more detail below.

As mentioned above, the curve 90" illustrates the effect of heat transfer of a thermal short in relation to gas pressure and emissivity, but it is representative of that effect only at or near the location of the metal-to-metal contact that causes the thermal short. As distance along either sidewall 46 or 48 from the metal-to-metal contact increases, the full effect of the change in heat transfer as indicated by curve 90" diminishes. Therefore, for a dynamic compact vacuum insulation panel that has a large surface area, partial or full transition between the relative heat transfer rates indicated by curves 90 and 90" in FIG. 6 can be implemented by providing a plurality of such thermal shorts at spaced distances from each other. Such thermal shorts dispersed over the surface of the compact vacuum insulation according to this invention can be turned "on" and "off" individually or in various combinations, either automatically, or by active control, as will also be described in more detail below.

Figure 7:
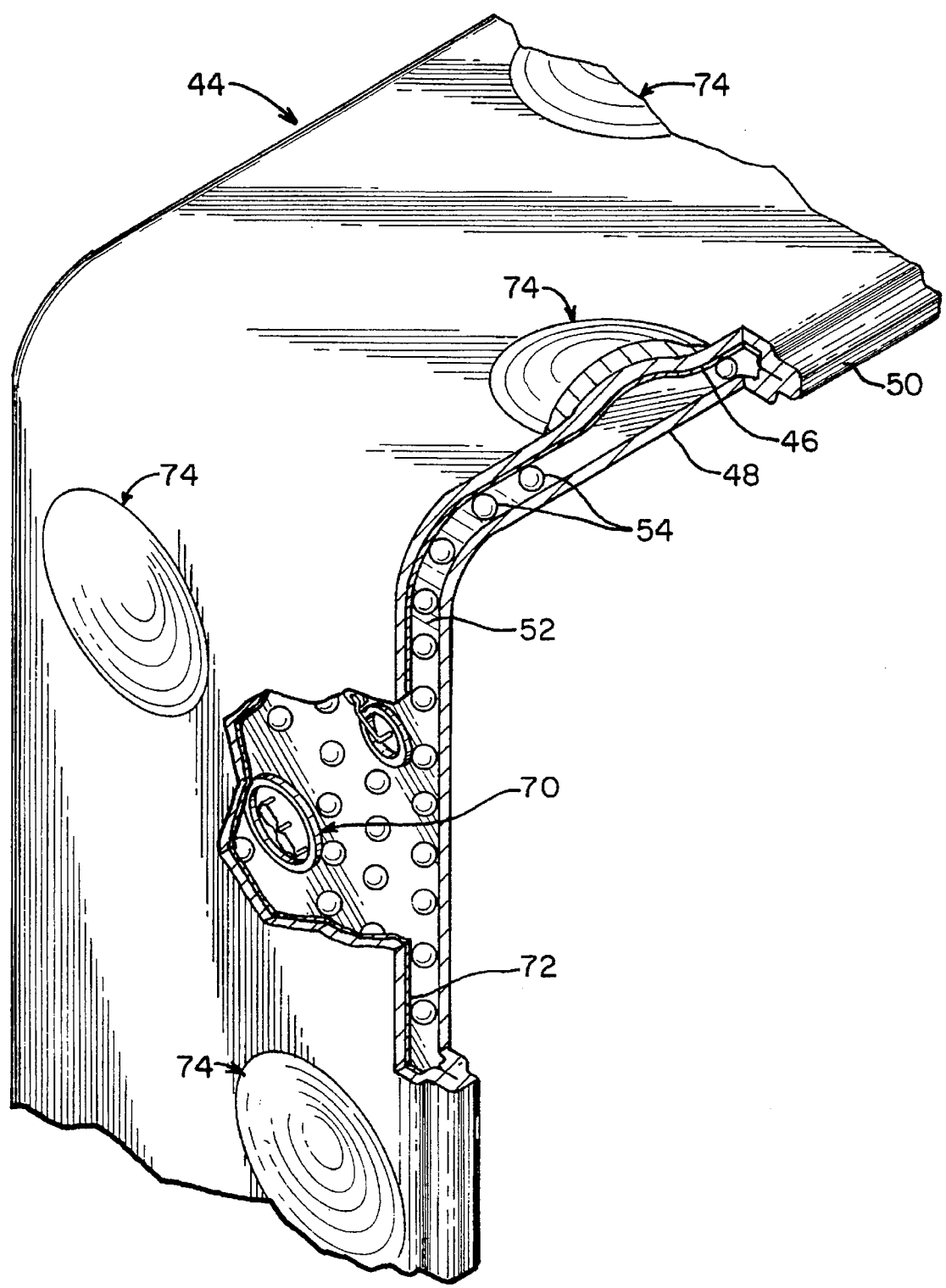
FIG. 7 is a perspective view of a compact vacuum insulation panel, equipped according to this invention with a gas controller apparatus, variable emissivity coating, and a plurality of bimetallic laminate metal-to-metal switches for selectively disabling the insulation panel.
Figure 8:
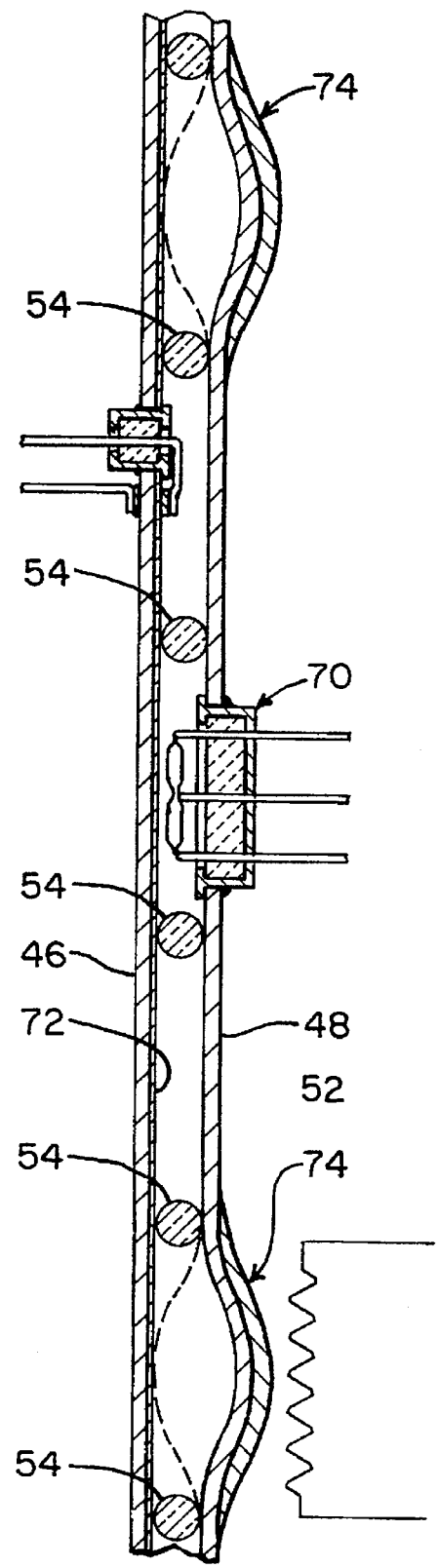
FIG. 8 is a cross-sectional view of the compact vacuum insulation panel of FIG. 7.

The compact vacuum insulation panel 44 is shown in FIG. 7 equipped with exemplary apparatus, according to this invention, for varying the thermal heat transfer or insulative characteristics in a dynamic manner by utilizing the principles discussed above. It includes gas control apparatus 70 for varying the mount and pressure of gas in the chamber 52, a variable emissivity coating 72 on the interior surface of sidewall 46, and a plurality of bimetallic laminate switches 74. The gas control apparatus 70 varies heat transfer by molecular conduction; the variable emissivity coating 72 varies heat transfer by varying infrared radiation; and the bimetallic laminate switches 74 vary the thermal transfer by creating thermal shorts through metal-to-metal contact between sidewalls 46, 48. Each of them can partially or completely turn the compact vacuum insulation panel 44 "on" and "off" to varying degrees and at varying temperatures and speeds, or they can be used together or in sequence for special effects to maximize or to optimize dynamic control of the compact vacuum insulation panel 44 for various applications. The gas control apparatus 70, variable emissivity coating 72, and bimetallic laminate switches 74 are shown in more detail as they are mounted in the compact vacuum insulation panel 44 in the enlarged cross-sectional view of FIG. 8. However, for purposes of a brief introduction, the gas control apparatus 70 preferably includes a metal hydride material for selectively storing, releasing, and retrieving hydrogen gas in the vacuum chamber 52. It preferably varies the vacuum pressure from at least as low as $10^{-6}$ torr to at least as high as about $10^{-4}$ torr. As shown by the portion 94 of curve 90 in FIG. 6, such a variation in gas pressure between $10^{-6}$ torr and $10^{-6}$ torr results in corresponding variations of heat transfer through the compact vacuum insulation panel 44.

The variable emissivity coating 72 may be a thin film of a thermochromic material that changes emissivity as a function of changing temperature. It can be used to vary heat transfer through panel 44 between curves 90 and 90' in FIG. 6. Materials such as vanadium oxide that change emissivity as a function of temperature can be used as a passive control, for example, increasing emissivity, thus heat transfer, with increases in temperature and vice versa. As an alternative, however, an electrochromic material such as nickel hydroxide $(Ni(OH)_2)$ or tungsten trioxide $(WO_3)$, which varies emissivity in response to application of electric potential, can be used for active variation in heat transfer resistance of the compact vacuum insulation panel 44 with external controls. It is preferable when using a variable emissivity coating 72 on one sidewall 46 to either eliminate the low emissivity coating 58 from the other sidewall 48 or to use a variable emissivity coating 72 on each sidewall 46, 48, because a low emissivity coating 58 on one sidewall 48 in combination with a variable emissivity coating 72 on the other sidewall 46 could defeat or thwart any increased radiative heat transfer produced when increasing the emissivity of the variable emissivity coating 72. Therefore, while the variable emissivity coating 72 is shown on only one sidewall 46, preferably the hot sidewall that is adjacent the heat source being selectively insulated, an additional variable emissivity coating could be used on the other sidewall 48, also.

The bimetallic laminate switches 74 causes a thermal short between sidewalls 46, 48, which varies heat transfer as described above and indicated between curves 90 and 90" in FIG. 6. Such bimetallic laminate switches are conducive to both passive and active applications, as will be described in more detail below. Such metal-to-metal contacts can also be induced by other mechanisms, such as nonlaminate structures of different metal combinations, externally anchored expandable metals, or metals that are plastically deformable in one temperature range, but which become elastic and return to an original memory configuration at another temperature range.

Heat Transfer Control Mechanisms

It is possible to control the heat transfer characteristics between the inner pot 30 and the outer pot 32 through a variety of these mechanisms. Many of these mechanisms are disclosed in detail in our previous patent, U.S. Pat. No. 5,318,108 entitled "Gas-Controlled Dynamic Vacuum Insulation With Gas Gate" and in our two pending U.S. patent applications, Ser. No. 08/194,933, filed Feb. 12, 1994, entitled "Radiation-Controlled Dynamic Vacuum Insulation" and Ser. No. 08/194,932, filed Feb. 12, 1994, and entitled "Material-Controlled Dynamic Vacuum Insulation" each of which is incorporated herein by reference.

Figure 9:
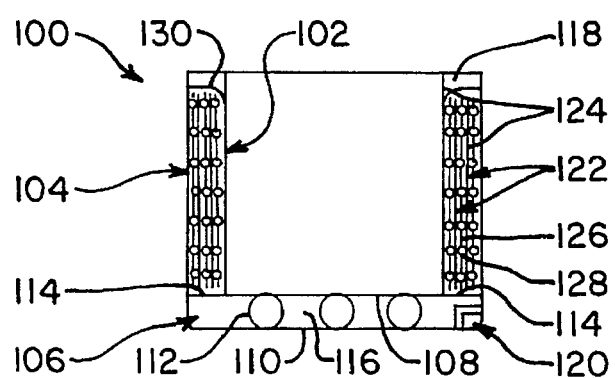
FIG. 9 is a cross-sectional view of the cooking pot shown in FIG. 1 illustrating a second embodiment thereof.

As shown in FIG. 9, a second embodiment of a cooking pot 100 includes an inner pot 102 and an outer pot 104 separated in a spaced-apart relationship to define a volume or chamber 106 therebetween. Located within the chamber between bottom surfaces 108, 110 of the inner and outer pots 102, 104 are a plurality of glass or ceramic spacers 112. A dividing wall 114 connects the inner pot 102 to the outer pot 104 and divides the chamber 106 into a lower chamber 116 and a side chamber 118. The side chamber 118 includes the annular space between the side of the inner pot 102 and the outer pot 104. Both the lower chamber 116 and the side chamber 118 are evacuated to a level in the range of $10^{-6}$ Torr, as described above. Also located within the lower chamber 116 is an insulation disable/enable mechanism 120 which selectively releases and reabsorbs hydrogen gas. When the hydrogen gas fills the lower chamber 116, the degree of vacuum is reduced, and the ability to transfer heat by conduction is thus increased. When the insulation disable/enable mechanism 120 is selected to re-enable the vacuum, the hydrogen gas is allowed to re-absorb in the metal hydride so as to re-evacuate the lower chamber 116. At such time, the heat transfer properties through the lower chamber 116 are again reduced putting the lower chamber 116 of the cooking pot 100 back into an insulating mode. The side chamber 118 of the cooking pot 100 is separated from the lower chamber 116 by the wall 114, as described above and thus the level of evacuation is not modified by actuation of the insulation disable/enable mechanism 120. A pair of metallic radiation shields 122 are provided within the side chamber 118 to reduce the ability to transfer heat by radiation between the inner and outer pots 102, 104. Each radiation shield 122 includes a low emissivity coating 124 on either side thereof. The facing side surfaces of the inner and outer pots 102, 104 are also coated with this low emissivity coating 124. As a consequence of the radiation shields 122, the number of low emissivity coatings 124 blocking radiation between the inner and outer pots 102, 104 is increased from two coatings to six coatings. In order to minimize the amount of heat transfer provided by conduction paths, the radiation shields 122 are separated from each other and from the inner and outer pots by one of a plurality of ceramic webs 126 in the form of a drape provided with a plurality of ceramic nodules 128. The ceramic webs 126 and the radiation shields 122 may be mounted to either the inner or outer pots 102, 104 via a strap 130 or metallic ring.

Thus, the cooking pot 100 has sides which maintain a high degree of insulation and a bottom surface which can be selected to insulate or conduct heat as desired. Radiation shields 122 such as these may be used for relatively higher temperature applications and such a cooking pot 100 will have a relatively higher cost. Pots without such shields will be available for lower cost and will be adequate for lower temperatures.

Figure 10:
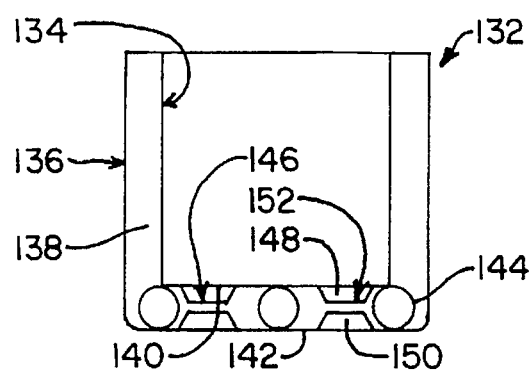
FIG. 10 is a cross-sectional view of the cooking pot shown in FIG. 1 illustrating a third embodiment thereof.

A third embodiment of a cooking pot 132, according to the present invention, shown in FIG. 10, includes an inner pot 134 and an outer pot 136 located in spaced-apart relation to each other and defining a volume or chamber 138 therebetween. Separating the inner pot 134 from the outer pot 136 along bottom surfaces 140, 142 thereof are a plurality of glass or ceramic spacers 144. Adjacent to the spacers 144 are a plurality of bimetallic switches 146. These switches 146 include a first contact 148 mounted to the inner pot 134 and a second contact 150 mounted to the outer pot 136. A gap 152 is defined between the first and second contacts 148, 150 of each bimetallic switch 146. When the switch 146 is activated the contacts 148, 150 are caused to come into contact with each other providing a metal-to-metal conduction path from the bottom surface 142 of the outer pot 136 to the bottom surface 140 of the inner pot 134. This conduction path increases the heat transfer capability of the cooking pot 132. The lid also employs compact vacuum insulation technology (not shown) to increase its insulating characteristics. Preferably, the lid is extended further than standard lids so as to reduce heat loss.

Figure 11:
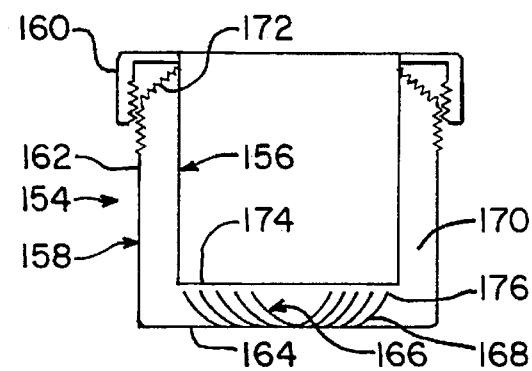
FIG. 11 is a cross-sectional view of the cooking pot shown in FIG. 1 illustrating a fourth embodiment thereof.
Figure 12:
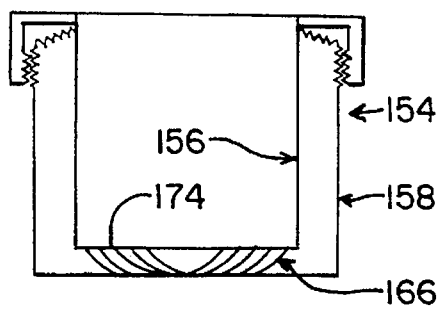
FIG. 12 is a cross-sectional view showing the fourth embodiment shown in FIG. 11 with the inner pot adjusted to an intermediate position within the outer pot.
Figure 13:
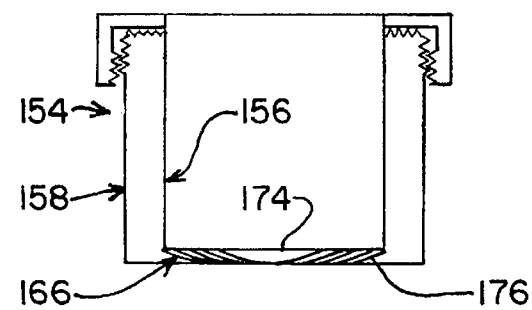
FIG. 13 is a cross-sectional view showing the fourth embodiment shown in FIGS. 11 and 12 with the inner pot adjusted a maximum distance into the outer pot.

A fourth embodiment of a cooking utensil, according to the present invention, is illustrated by a cooking pot 154 as shown in FIGS. 11, 12 and 13. The pot includes an inner pot 156 received within an outer pot 158. The inner pot 156 includes an extended lip 160 which is internally threaded to mate with threads on the exterior surface 162 of the outer pot 158. By turning the inner pot 156 relative to the outer pot 158, the depth of penetration of the inner pot 156 into the outer pot 158 can be adjusted. The outer pot 158 includes a plurality of metallic fingers 166 which are each attached at fixed ends 168 to a bottom surface 164 of the outer pot 158. The metallic fingers 166 extend vertically and radially outwardly so as to be positioned at a generally diagonal angle when in a relaxed position. In order to retain the highly evacuated state within a chamber 170 defined between the pots 156, 158, the pots 156, 158 are connected by a flexible bellows 172 which connects the side surfaces of the inner and outer pots 156, 158. Not only does the bellows 172 allow for relative movement of the inner and outer pots 156, 158 but it increases the length of the conduction path therealong. As shown in FIG. 11, when a bottom surface 174 of the inner pot 156 is positioned a maximum distance away from the bottom surface 164 of the outer pot 158 by rotating the inner pot 156, the bottom surface 174 of the inner pot 156 does not contact the metal fingers 166 and there is no conduction path between the bottom surfaces 174, 164 of the inner and outer pots 156, 158. As shown in FIG. 12, after the inner pot 156 is adjusted to an intermediate position relative to the outer pot 158, the bottom surface 174 of the inner pot 156 comes into light contact with free ends 176 of the metal fingers 166. At this time, there is a conduction path between the bottom surfaces 174, 164 of the inner and outer pots 156, 158. However, due to the relatively light pressure contact of the metal fingers 166 with the inner pot 156, the conduction path is not maximized. As shown in FIG. 13, when the inner pot 156 is adjusted to a maximum position into the outer pot 158, the bottom surface 174 of the inner pot 156 makes strong contact with the free ends 176 of the metal fingers 166 and provides a good conduction path between the bottom surfaces 174, 164 of the inner and outer pots 156, 158.

Thus, it can be appreciated that the cooking pot 154 allows the operator or cook to control the amount of conduction, or conversely the amount of insulation, between the inner and outer pots 156, 158. When cooking or heating of the food (not shown) within the inner pot 156 is desired, the inner pot 156 can be adjusted to the position shown in FIG. 13. After the food has been fully cooked and it is desired to maintain the food in the inner pot 156 at a relatively warm temperature, the inner pot 156 can be adjusted to the position shown in FIG. 11, to return the pot to an insulating mode. In an alternative arrangement (not shown), the metallic fingers 166 can be angled so that in a relaxed position, the free ends 176 of adjacent fingers are progressively closer to the bottom surface of the inner pot.

Consequently, with adjustments of the inner and outer pots 156, 158, a gradually increasing or decreasing amount of conduction paths can be created. Further, the metallic fingers 166 in each of these embodiments have the characteristics that they deform and bend with increased temperature. Consequently, when the bottom surface 164 of the outer pot 158 is sufficiently hot, in the range of fifty percent of the melting temperature, in degrees Kelvin, of the surface material, the fingers 166 will each have bent far enough to make contact with the inner pot 156 creating a plurality of conduction paths. This characteristic helps to save the outer pot 158 from melt down or other damage from excessive overheating.

Figure 21:
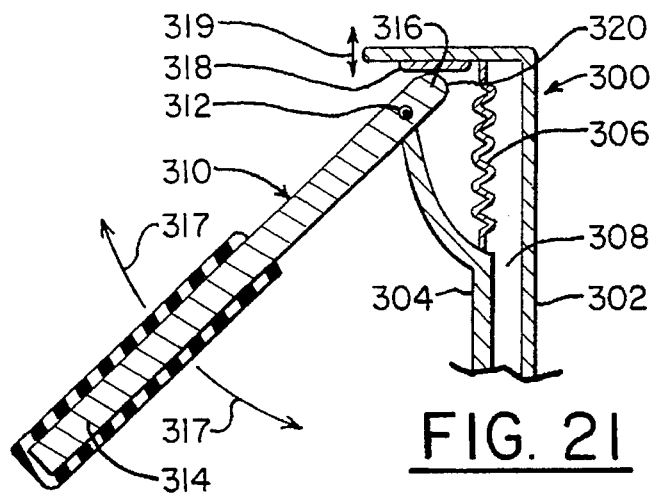
FIG. 21 is a cross-sectional view of a portion of the fifth embodiment of the cooking utensil, illustrating the operation of a lever to separate the pots.
Figure 22:
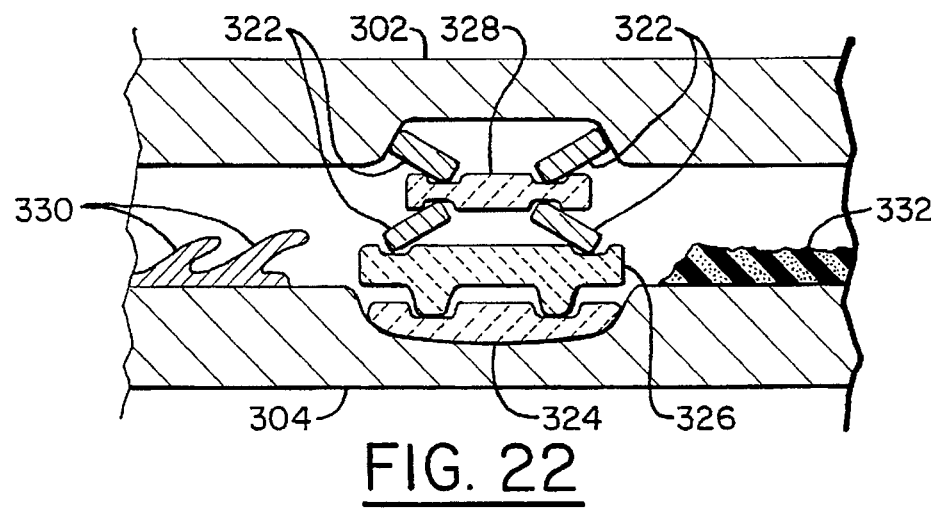
FIG. 22 is a cross-sectional view of another portion of the fifth embodiment of the cooking utensil, illustrating means for biasing the inner pot away from the outer pot.

A fifth embodiment of a cooking utensil of the present invention includes a cooking pot 300 as shown in FIGS. 21 and 22. The cooking pot 300, like the pot 154 of the fourth embodiment, provides a means for adjusting the distance between an inner pot 302 and an outer pot 304. A relatively stiff bellows 306 (FIG. 21) connects the outer pot 304 to the inner pot 302 and acts as a spring urging the inner pot 302 away from the outer pot 304 so as to partially compensate for the atmospheric load which itself tends to urge the inner pot 302 closer to the outer pot 304 because of an evacuated chamber 308 defined between the pots 302 and 304. In order to adjust the distance of the pots 302 and 304 from each other, a lever 310 is pivotably mounted with a pin 312 to the outer pot 304 with an exposed handle end 314 and an opposite cam end 316 which bears against a contact surface 318 on the inner pot 302. Movement of the lever 310 in the directions shown by the first pair of arrows 317 results in movement of the inner pot 302 relative to the outer pot 304 in the directions shown by the second pair of arrows 319. The width of the lever 310 is significantly narrower than the distance from the pin 312 to the cam end 316 to provide for sufficient variation in the distance between the pots 302 and 304. Preferably the cam end 316 is provided with a plurality of flattened outer surfaces 320 to allow the lever 310 to remain in any one of various positions without being held.

As shown in FIG. 22, the bottom surfaces of the pots 302 and 304 are biased away from each other by a pair of disc springs 322 held in place by ceramic pieces 324, 326 and 328. The disc springs 322 serves to further compensate for the atmospheric loading, and in combination with the bellows 306 (shown in FIG. 21) they reduce the force necessary to separate the pots to a value between 40 and 160 pounds. With the lever 310 preferably having a mechanical advantage in the range of 16 to 1, the operator requires only 3.5 to 10 pounds of force to operate the lever 310. In addition or alternatively, the bottom surfaces may be biased apart with a series of different-height leaf springs 330 and/or conformable material 332.

Figure 23:
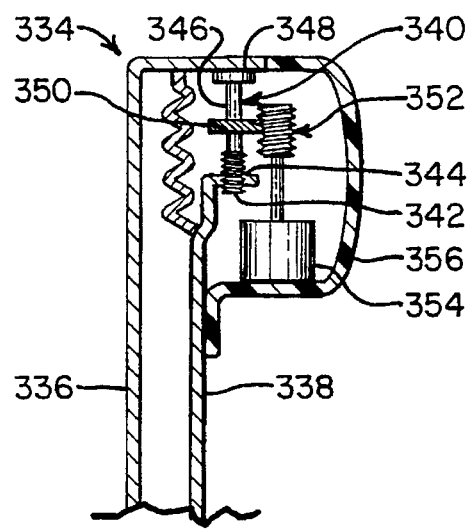
FIG. 23 is a cross-sectional view of a portion of the sixth embodiment of the cooking utensil, illustrating a thumb screw/won gear arrangement (shown in schematic form) for adjusting the separation between the inner and outer pots.
Figure 19:
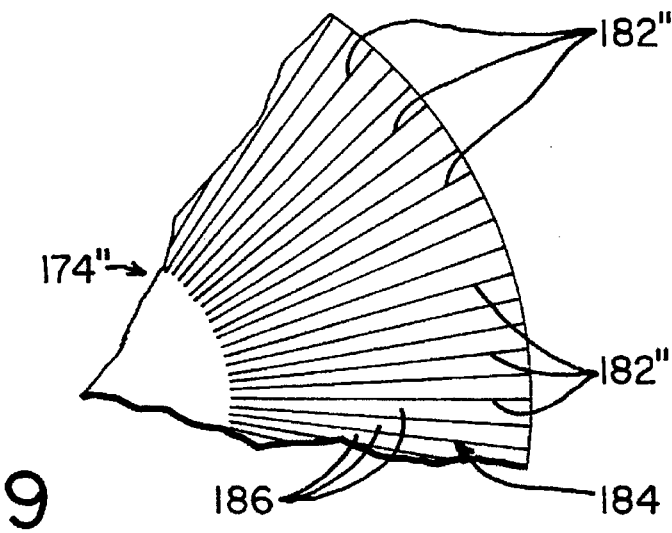
FIG. 19 is an enlarged view of the bottom surface shown in FIG. 18 and illustrating an alternative embodiment with sub-lands.
Figure 24A:
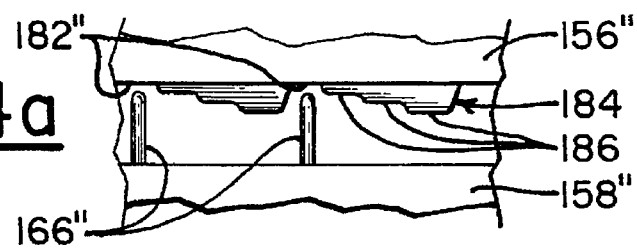
FIG. 24a is a schematic diagram of the alternative embodiment shown in FIG. 19, illustrating the fingers in grooves on the bottom surface of the inner pot.
Figure 24B:
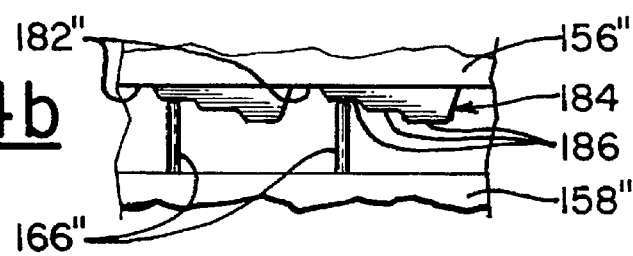
FIG. 24b is a schematic diagram of the alternative embodiment shown in FIG. 19, illustrating the fingers making soft contact with the smallest sub-land.
Figure 24C:
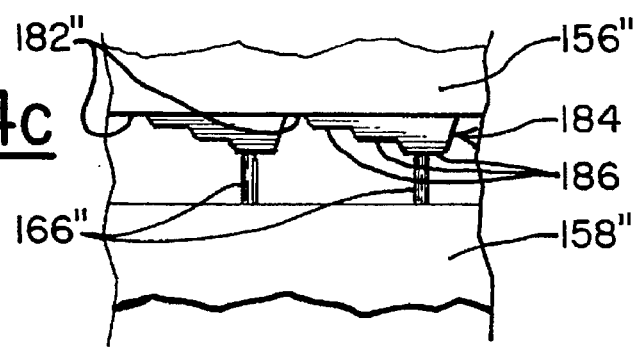
FIG. 24c is a schematic diagram of the alternative embodiment shown in FIG. 19, illustrating the fingers making hard contact with the largest sub-land.

A sixth embodiment of a cooking utensil of the present invention includes a cooking pot 334 as shown in FIG. 23. An inner pot 336 and an outer pot 338 are adjustable in separation distance by a thumb screw mechanism 340. A threaded end 342 of the screw 340 is received within a threaded hole 344 defined in the outer pot 338. An opposite end 346 of the screw 340 bears against a contact surface 348 on the inner pot 336. The screw 340 is adjustable by turning a knurled screwhead 350. If necessary to provide torque or automation, a worm gear 352 may be provided to drive the screwhead 350. The worm gear 352 may be provided with and driven by a small electric motor 354 which may be externally controlled. Preferably the entire arrangement is covered by a plastic or metal shield 356.

Figure 17:
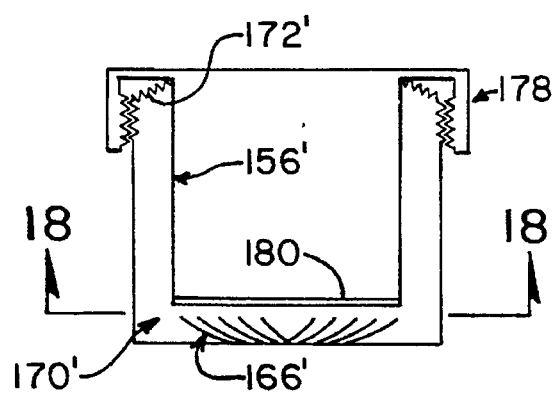
FIG. 17 is a cross-sectional view of the cooking pot shown in FIG. 1 illustrating a fifth embodiment thereof.
Figure 18:
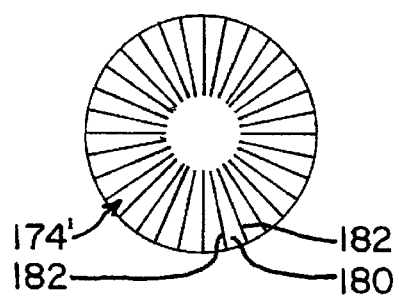
FIG. 18 is a cross-sectional view of the cooking pot shown in FIG. 17 taken substantially along line 18—18, illustrating the bottom surface of the inner pot and the lands thereon.

A seventh embodiment of a cooking utensil of the present invention includes a cooking pot 178 as shown in FIGS. 17 and 18. The cooking pot 178 is similar to the cooking pot 154 of the fourth embodiment (common components shown with a prime indication) with the difference that the bottom surface 174' of the inner pot 156' includes a plurality of lands 180 and grooves 182 each of which extend radially away from the center of the bottom surface 174. Each land 180 and groove 182 may encompass approximately 1/32nd of a full rotation on a circle on the bottom surface 174' of the inner pot 156'. Thus, with the metallic fingers 166' held stationary, the inner pot 156' need only be rotated 1/32nd of a rotation to convert the cooking pot 178 from the insulating to the conducting mode. This decreased amount of rotation required to convert modes as compared to the fourth embodiment reduces the flexibility requirement of the bellows 172'. In an alternative arrangement shown in FIGS. 19 and 24a–24c, each land 184 is provided with a plurality of sub-lands 186, each having a progressively increased size to provide progressive and gradual adjustment of the amount and pressure of the contact for the conduction path between the inner and outer pots 156" and 158" as provided by the metallic fingers 166".

Heat-Retention Materials

Figure 14:
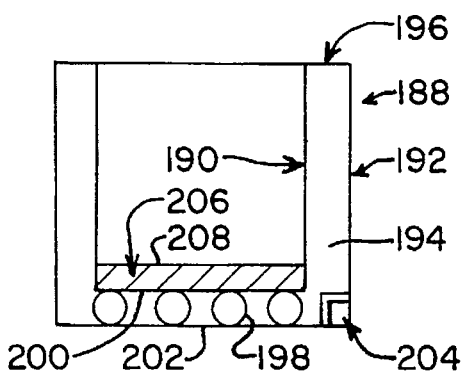
FIG. 14 is a cross-sectional view of the cooking pot shown in FIG. 1 illustrating a sixth embodiment thereof.

An eighth embodiment of a cooking utensil, according to the present invention, includes a cooking pot 188 having an inner pot 190 received within an outer pot 192 at a spaced-apart distance therefrom to define a volume or chamber 194 therebetween, as shown in FIG. 14. The chamber 194 is sealed off by a foil leaf 196 connecting the upper edges of the sides of the inner and outer pots 190, 192. Located within the chamber 194 are a plurality of glass or ceramic spacers 198 supporting a bottom surface 200 of the inner pot 190 and located between the bottom surface 200 of the inner pot 190 and a bottom surface 202 of the outer pot 192. Also located within the chamber 194 is an insulation disable/enable mechanism 204 as discussed above. The interior of the inner pot 190 is provided with a volume of phase change material 206 such as a petroleum wax located within the inner pot 190 adjacent to the bottom surface 200 thereof. Such materials 206 are discussed in more detail in U.S. patent application, Ser. No. 08/188,394, which is incorporated herein by reference.

Located on top of the phase change material 206 is a cooking surface 208 for the inner pot 190. The phase change material 206 is in solid form at room temperature or approximately twenty degrees centigrade and may turn to a liquid form at an elevated temperature of ninety-five degrees centigrade, for example. The phase change material 206 has superior heat retention characteristics and can thus be used to maintain the food within the inner pot 190 at a desired temperature for an extended length of time. To use the cooking pot 188, the insulation disable/enable mechanism 204 is activated to place the cooking pet 188 into a conducting mode and the bottom surface 202 of the outer pot 192 is exposed to a source of heat. The phase change material 206 and the food within the inner pot 190 on top of the cooking surface 208 are heated as well. At the selection of the cook, the insulation disable/enable mechanism 204 may be enabled and the cooking pot 188 may be removed from the source of heat. The phase change material 206 can only transfer a minimum of heat through the insulated chamber 194 to the outer pot 192 so the remaining heat energy is transmitted slowly to the interior of the inner pot 190 and applied to the food therein.

Figure 15:
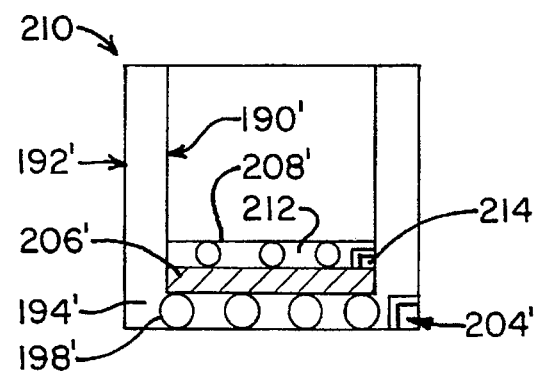
FIG. 15 is a cross-sectional view of the cooking pot shown in FIG. 1 illustrating a seventh embodiment thereof.

A ninth embodiment of cookware, according to the present invention, is shown in a cooking pot 210 shown in FIG. 15. The cooking pot 210 shown in FIG. 15 is similar to the cooking pot 188 of the eighth embodiment shown in FIG. 14 (common components shown with a prime indication) with the difference being an additional interior evacuated chamber 212 in the cooking pot 210 between the phase change material 206' and the cooking surface 208' on which the food is placed. This interior evacuated chamber can be similarly enabled and disabled with a second insulation disable/enable mechanism 214. Thus, disabling this interior evacuated chamber 212 at a subsequent time after originally cooking the food allows for subsequent reheating of the food at a remote location.

Each of the outer pots described in this application are preferably standard gauge glass, ceramic or stainless steel with or without copper or aluminum cladding. The outer pot is preferably composed of a low conductance material such as glass or ceramic if the heat source employs inductive heating by electromagnetic propagation. Each of the inner pots are preferably standard or lighter-gauge stainless steel with or without copper or aluminum cladding. Copper, of course, has desirable heat spreading characteristics. The bottom surface of the outer pot is preferably flat to provide a steady support surface for the pot and to maximize heat transfer from the heat source. The cooking surface at the bottom of the inner pot is preferably flat and provided with a known non-stick coating to simplify the cooking operation. Each embodiment can be provided in any size and shape including coffee and tea pots.

The weld or foil leaves connecting the inner and outer pots are preferably covered on the exterior with a coating such as polyamide to protect same from corrosion and ordinary wear and tear as well as to aid cleaning, while forming a relatively low thermal conductance path. Alternatively, the chamber can be closed off with a ceramic material attached during vessel fabrication to effectively form a hermetic fusion seam.

Because of the relatively rigid nature of the inner and outer pots, it may not be necessary to provide spacers to prevent the walls of the pots from collapsing toward each other in the presence of the vacuum. The spacers will preferably be employed, however, between the bottom surfaces of the pots to support the inner pot and thus protect the weld, foil, or bellows when the pot is dropped on the floor, for example.

Automatic and Programmable Operation

Figure 16:
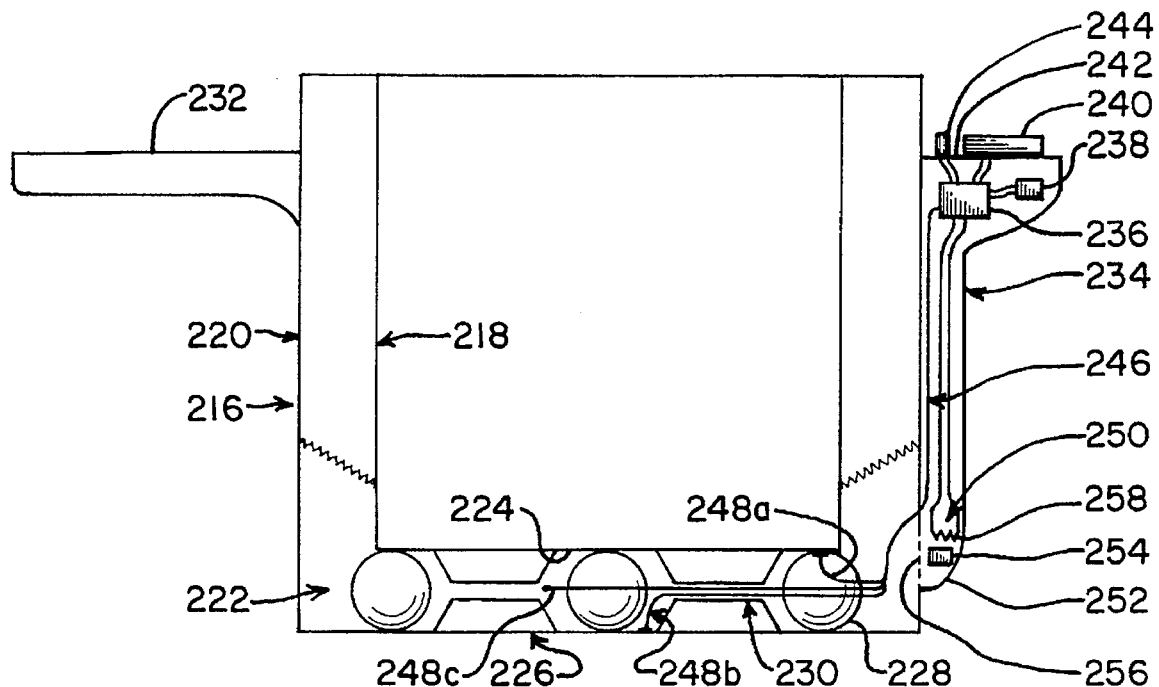
FIG. 16 is a cross-sectional view of the cooking pot shown in FIG. 1 illustrating a eighth embodiment thereof and illustrating an automatic and programmable operating cooking utensil, including a microprocessor and controls therefore.

A tenth embodiment of a cooking utensil of the present invention is shown in a cooking pot 216 shown in FIG. 16. The cooking pot 216 includes an inner pot 218 received within an outer pot 220 in a spaced-apart relation to define a volume or chamber 222 therebetween. Located within the chamber 222 between the bottom surfaces 224, 226 of the inner and outer pots 218, 220 are a plurality of glass or ceramic spacers 228. Adjacent to the spacers 228 are a plurality of bimetallic switches 230 for controlling the mount of metal-to-metal conduction between the inner and outer pots 218, 220, as discussed in more detail above. A carrying handle 232 extends radially outwardly from the outer pot 220. On an opposite side of the outer pot 220 is an auxiliary handle 234 which contains electronics therein. A microprocessor 236 and associated memory are powered by a battery 238, all of which are located in the auxiliary handle 234. A section (not shown) of the auxiliary handle 234 containing the battery 238 can be removed from the pot 216 and placed into a battery charger or into an AC wall outlet. During such time, the memory of the microprocessor 236 is maintained with a back-up battery or capacitor (neither of which is shown). A keypad 240 located on a top surface 242 of the auxiliary handle 234 allows the operator or cook to input commands to the microprocessor 236. A data port 244 such as a serial RS-232 port is also provided on the top surface 242 of the auxiliary handle 234. The data port 244 allows for data transfer from a data storage device or digital computer (not shown) such as a personal computer directly into the microprocessor 236. The microprocessor 236 is provided with a coaxial temperature sensor wire 246 which is routed through the auxiliary handle 234 into the chamber 222 with free ends 248a, 248b, and 248c disposed within the chamber 222 to sense the temperatures therein and of the bottom surfaces 224, 226.

A gas control insulation disable/enable mechanism 250 such as described above is provided in a bottom portion 252 of the auxiliary handle. The mechanism 250 includes a metal hydride 254 and a palladium window or gate 256 between the metal hydride 254 and the chamber 222. The palladium window 256 controls the passage of gas therethrough. Thus, when the palladium window 256 is closed, no hydrogen gas can pass into or out of the chamber 222. When the palladium window 256 is open, hydrogen is free to flow into and out of the chamber 222. The microprocessor 236 controls a resistive heater 258 associated with the metal hydride 254 to control the release and reabsorption of the hydrogen gas. When the metal hydride 254 is heated, gas is released and when the metal hydride 254 is cooled, the gas is reabsorbed. In this manner, the microprocessor 236 can smoothly and gradually control the amount of insulation between the inner and outer pots 218 and 220. Together with the sensed temperature information from sensor wire 246, the microprocessor 236 can vary the insulation to achieve desired cooking temperatures.

The bimetallic switches 230 are provided to allow for quick, nearly immediate, transfer of heat between the inner and outer pots 218, 220, as may be necessary to prevent meltdown or other damage of the outer pot 220 due to overheating.

With the cooking pot 216 of this embodiment, the following operations are possible. The microprocessor 236 can be programmed at the factory, by the cook through the keypad 240, or by another digital device through the data port 244 to perform a specified cooking program. The cooking pot 216 is then placed on a source of heat and the cooking program is initiated. The microprocessor 236 controls the palladium window 256 and the metal hydride 254 to disable the vacuum between the bottom surfaces 224, 226 of the inner and outer pots 218, 220 so that the inner pot 218 can be quickly heated by the heat source via the bottom surface 226 of the outer pot 220. After a set time period, the microprocessor 236 controls the palladium window 256 and metal hydride 254 to partially re-enable the insulating characteristics of the cooking pot 216 so that a reduced amount of heat is transferred from the source of heat to the inner pot 218. After an additional set time period the amount of insulation can be varied to reduce or increase the amount of heat transferred to the inner pot 218. As can be seen, this procedure can be continued or repeated as necessary to obtain programmed cooking of the food within the inner pot 218. An alarm indicator (not shown) is provided to warn the cook of the completion of the programmed cooking schedule, low battery, or over/under temperature indication.

An automatic stirring device and a separate food container located above the inner pot 218 for selectively dropping food ingredients into the inner pot 218 as needed (neither of which are shown) can be added to the cooking pot 216 to provide a completely self-contained and automatic cooking device.

The cook may purchase or otherwise receive computer diskettes (not shown) containing thousands of preprogrammed recipes for potential storage in the microprocessor 236 of the cooking pot 216. The diskettes can be loaded into a personal computer and selected ones can be automatically downloaded through the data port 244 into the microprocessor 236 and its associated memory. The cook can then select the desired recipe through the keypad 240. To compensate for variations in the heat output of the heat source, and in the boiling temperature of water at various altitudes, a calibration can be performed by the cook. The cook can fill the cooking pot 216 with a specified amount of water, select the calibrate mode through the keypad 240 and place the pot 216 on a heat source operating at any heat output level capable of achieving boiling. The cook then allows the water to begin to boil and removes the pot 216 from the heat source. At this point, the time and temperature to boil will be transferred into the microprocessor. The microprocessor 236 then knows, for that specific altitude and with that or other similar heat source, how much heat it will take to boil water and can adjust all of its recipes accordingly.

The memory of the microprocessor 236 allows it to "memorize" a cooking schedule as the schedule is performed by the pot 216. This schedule can be repeated in the future by commanding the microprocessor 236 to do so, much like a "redial" feature on a modem telephone. In addition, the "memorized" schedule can be transferred via data port 244 to an external computer or data storage device (not shown) or to another pot 216. This allows the cooking schedules or recipes of famous and less famous cooks to be passed along to others as desired.

EXAMPLES

With the cooking pots of the present invention the heat-holding time is greatly extended. For example, the time for three liters of water within the pot to cool from 100° C. to 60° C. can be extended by ten to fifteen times over standard pots. In the cooking pots of the present invention the time period to cool from 100° C. to 60° C. is approximately 20 hours (while the outer pot has cooled to below 35° C. within 30 minutes). on the other hand, water in a standard steel pot will cool from 100° C. to 60° C. in one and a half hours, or two hours with a standard glass pot. Obviously, these capabilities are important in preserving the elevated temperatures of hot drinks such as coffee and tea. With a heat loss of only 2° C. per hour, hot coffee can be maintained in its cooking vessel significantly longer than with present technology, without the constant addition of heat that causes off-flavors.

Figure 20:
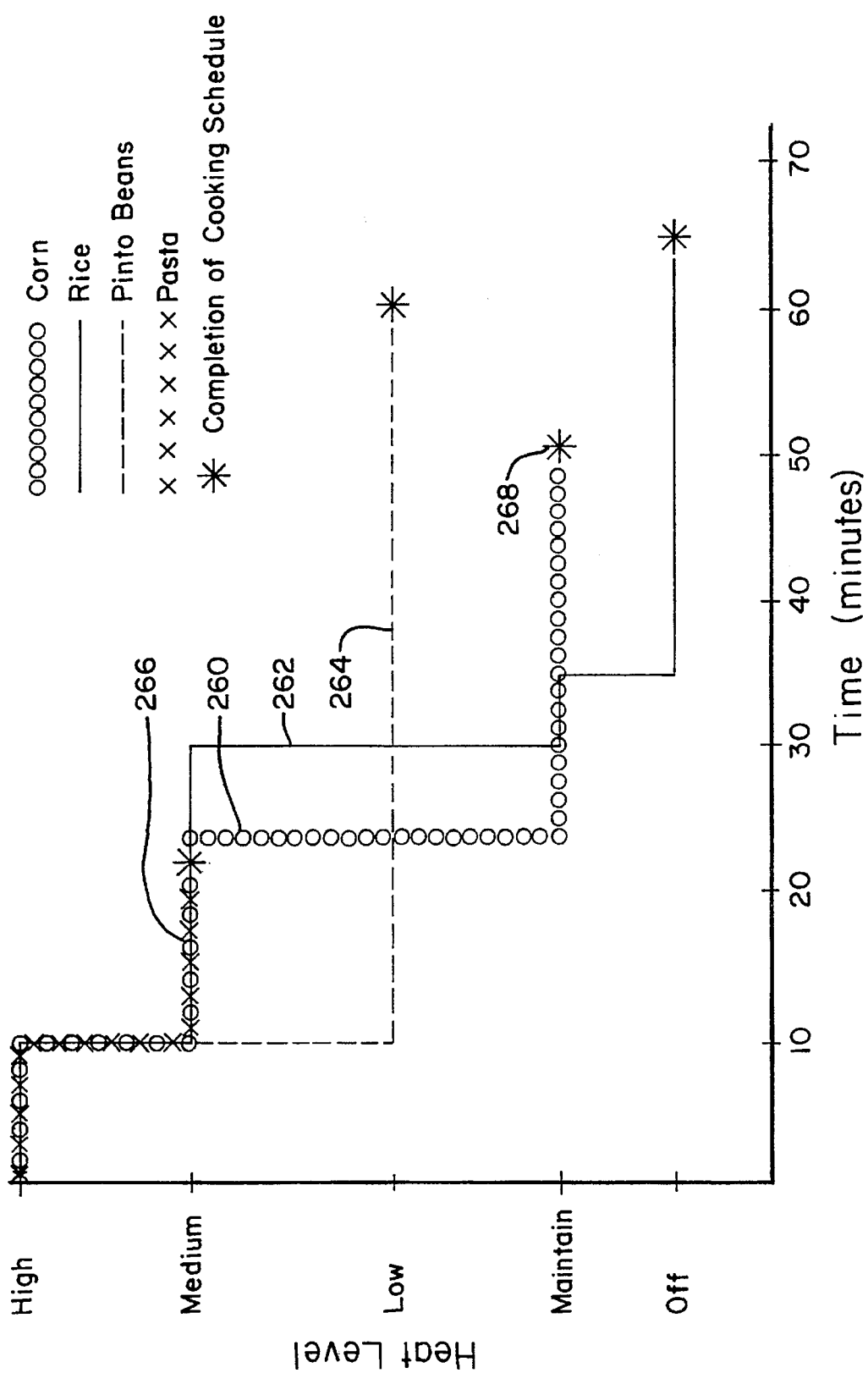
FIG. 20 is a graphical representation of cooking schedules for selected food items as prepared by the eighth embodiment of the cooking pot.

As can be seen in FIG. 20, cooking schedules for cooking most items in a pot begin with a maximum temperature for bringing water to a boil followed by a plurality or series of reduced temperatures to maintain a boil, maintain a simmer, etc. The required cooking temperature schedules for a variety of food items are illustrated in FIG. 20.

As shown in FIG. 20, for items which require boiling water for food preparation, there are selected time intervals and selected temperatures to prepare any of four different food items. Curve 260 shows the time durations and cooking levels for preparing corn. As can be seen, the cooking utensil is placed at a high cooking level for ten minutes to initiate boiling of the water placed therein. Next, the cooking level is at a medium level to maintain the boiling of the water. Following that, the cooking level is at a maintain or warm level for twenty-six minutes to hold at serving temperature. A similar but somewhat different curve 262 illustrates the cooking schedule for cooking rice. A similar but somewhat different curve 264 shows the cooking schedule for cooking pinto beans. A similar but somewhat different curve 266 shows the cooking schedule for cooking pasta. An asterisk 268 designates the end of the cooking schedule when the food is ready to be served.

While there are numerous obvious advantages which are achieved by the present invention, an indirect advantage is the reduced contamination and cooling potential from transferring from a cooking container to a serving container. Since the cooking pots of the present invention have superior heat retention characteristics, they can serve as both cooking utensils and temperature-maintenance and serving utensils. By eliminating this transfer to another container, the risk of contamination by contact with other utensils and other extra utensils is decreased. This advantage is an important one in the area of commercial food preparation.

The foregoing description is considered as illustrative only of the principles of the invention. Furthermore, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims which follow.

The embodiments of the invention in which an exclusive property or privilege is claimed are defined as follows:

1. A cooking utensil comprising:

an outer shell having an inner surface and an outer surface, said outer surface being exposable to the source of heat;

an inner shell positioned adjacent and in juxtaposed relation to the outer shell in a manner that encloses a chamber between the inner shell and the outer shell, said inner shell having an inner surface that is shaped to define a container, said chamber being evacuated to a level sufficient to inhibit heat transfer by gas molecular conduction between the inner shell and the outer shell; and heat transfer control means operatively connected to the cooking utensil for varying heat transfer capability between the inner shell and the outer shell.

2. A cooking utensil as defined in claim 1, wherein the heat transfer control means includes thermal conductance varying means for varying heat transfer by thermal conductance between the inner shell and the outer shell.

3. A cooking utensil as defined in claim 2, wherein the thermal conductance varying means includes surface contact control means for varying area of surface contact between the outer surface of the inner shell and the inner surface of the outer shell.

4. A cooking utensil as defined in claim 3, wherein the inner shell and the outer shell are each metallic.

5. A cooking utensil as defined in claim 4, wherein the surface contact controlling means is a bimetallic switch.

6. A cooking utensil as defined in claim 4, wherein the surface contact controlling means is a bulge on the outer shell which bulges out when at a sufficiently high temperature and returns to a relaxed position when not at a sufficiently high temperature.

7. A cooking utensil as defined in claim 4, wherein the surface contact controlling means includes a plurality of metallic, elongated fingers each attached at a fixed end to the inner surface of the outer shell, with free ends of the fingers extending upwardly toward the outer surface of the inner shell.

8. A cooking utensil as defined in claim 7, wherein the free ends of the metallic fingers are not in contact with the inner shell at normal room temperature and the metallic fingers deform and bend when heated so that at a sufficiently high temperature the free ends of the metallic fingers are in contact with the inner shell.

9. A cooking utensil as defined in claim 8, wherein the inner shell is threadedly received within the outer shell so that the height of the portion of the chamber between the bottom surfaces of the inner and outer shells can be varied to vary the temperature at which the metallic fingers are in contact with the inner shell.

10. A cooking utensil as defined in claim 9, wherein the outer surface of the inner shell is provided with a plurality of spaced-apart lands, the lands extending toward the outer shell and defining grooves between adjacent lands, wherein rotation of the inner shell relative to the outer shell can selectively and alternatively position the free ends of the metallic fingers in alignment with a land or with a groove.

11. A cooking utensil as defined in claim 10, wherein each land includes a plurality of sub-lands, each sub-land being progressively sized to extend further toward the outer shell than the next adjacent sub-land.

12. A cooking utensil as defined in claim 2, wherein the thermal conductance varying means includes gas control means for varying amounts of thermal-conducting gas molecules in the chamber.

13. A cooking utensil as defined in claim 12, wherein the gas control means is adjustable to selectively increase and decrease amounts of thermal-conducting gas molecules in the chamber.

14. A cooking utensil as defined in claim 13, wherein the thermal-conducting gas molecules are hydrogen gas molecules.

15. A cooking utensil as defined in claim 14, wherein the gas control means includes a metal hydride that absorbs and retains hydrogen gas molecules as temperature of the metal hydride decreases and releases hydrogen gas as temperature of the metal hydride increases, said metal hydride being positioned in hydrogen gas flow communication with said chamber so that the heating the metal hydride releases hydrogen gas molecules from the metal hydride into the chamber and cooling the metal hydride removes hydrogen gas molecules from the chamber for absorption and retention by the metal hydride.

16. A cooking utensil as defined in claim 15, wherein the gas control means further includes:

gate means positioned between said metal hydride and said chamber for selectively allowing hydrogen gas molecules to flow or not to flow between said metal hydride and said chamber.

17. A cooking utensil as defined in claim 16 wherein the gate means is a palladium window.

18. A cooking utensil as defined in claim 15, wherein said chamber is evacuated to a gas pressure at least as low as $10^{-5}$ torr when said metal hydride is cooled to a sufficiently low temperature to absorb and retain hydrogen gas molecules and wherein said metal hydride is sufficient in quantity to release enough hydrogen gas molecules into said chamber to raise said gas pressure in said chamber to at least as high as $10^{-4}$ torr when said metal hydride is heated to a temperature above said low temperature.

19. A cooking utensil as defined in claim 18, wherein the vacuum in said chamber comprises a gas pressure at least as low as $10^{-6}$ torr when said hydrogen is not released from said metal hydride and wherein said metal hydride is sufficient in quantity to release enough hydrogen gas to raise said gas pressure in said chamber to at least as high as $10^{-4}$ torr.

20. A cooking utensil as defined in claim 15, further comprising:

heater means operatively connected to the cooking utensil for selectively heating the metal hydride.

21. A cooking utensil as defined in claim 1, wherein the heat transfer control means includes radiation control means for controlling heat radiated between the inner shell and the outer shell.

22. A cooking utensil as defined in claim 2, wherein the inner surface of the outer shell and the outer surface of the inner shell are provided with a low emissivity coating to reduce radiative heat transfer.

23. A cooking utensil as defined in claim 22, further comprising:

an annular wall extending from the inner shell to the outer shell to divide the chamber into a bottom chamber and a side chamber, wherein the thermal conductance varying means is located in the bottom chamber; and a radiation shield suspended in the side chamber and operatively connected to the cooking utensil, the shield having an inner side and an outer side, wherein the inner and outer sides of the shield are provided with a low emissivity coating to reduce radiative heat transfer.

24. A cooking utensil as defined in claim 23, further comprising:

a first and second spacer drape composed of a relatively low heat conductance material, the first spacer drape positioned between the shield and the outer shell and the second spacer drape positioned between the shield and the inner shell.

25. A cooking utensil as defined in claim 22, wherein the low emissivity coating is thermochromic in a manner that increases radiation of heat when temperature of said coating increases and that reduces radiation of heat when temperature of said coating decreases.

26. A cooking utensil as defined in claim 22, wherein the low emissivity coating is electrochromic in a manner that varies radiation of heat in response to variation of a voltage applied to said coating.

27. A cooking utensil as defined in claim 2, further comprising:

an annular wall extending from the inner shell to the outer shell to divide the chamber into a bottom chamber and a side chamber, wherein the thermal conductance varying means is located in the bottom chamber.

28. A cooking utensil as defined in claim 2, further comprising:

a mass of phase-change material retained within the inner shell to retain heat and release heat gradually.

29. A cooking utensil as defined in claim 28, wherein said mass of phase-change material retained in a bottom portion of the inner shell and further comprising:

a cooking surface located within the container in a position adjacent and above the mass of phase-change material.

30. A cooking utensil as defined in claim 29, further comprising:

an intermediate wall between the mass of phase-change material and the cooking surface, the wall being in closely spaced-apart relation to the cooking surface so as to define an inner chamber therebetween; and means located within the inner chamber for varying the thermal conductance between the intermediate wall and the cooking surface.

31. A cooking utensil as defined in claim 1, further comprising:

controlling means for controlling the heat transfer varying means to control the heat introduced to the inner shell over a selected time period.

32. A cooking utensil as defined in claim 31, wherein said controlling means includes a timer.

33. A cooking utensil as defined in claim 31, wherein said controlling means includes a microprocessor.

34. A cooking utensil as defined in claim 33, further comprising:

an electric power source for supplying the microprocessor with electrical power; and data input means for providing data inputs to the microprocessor.

35. A cooking utensil as defined in claim 34, wherein said data input means includes a keypad.

36. A cooking utensil as defined in claim 34, wherein said data input means includes a serial data port.

37. A cooking utensil as defined in claim 33, wherein said microprocessor is operative to perform a programmed cooking schedule by selectively controlling the thermal conductance varying means.

38. A cooking utensil as defined in claim 37, wherein said microprocessor is operative to memorize the programmed cooking schedule.

39. A cooking utensil as defined in claim 33, wherein said microprocessor is operative to vary the control of the thermal controlling means based upon environmental factors.

40. A cooking utensil as defined in claim 39, wherein the environmental factors include cooking altitude.

41. A cooking utensil as defined in claim 2, wherein the thermal conductance varying means includes a lever pivotably mounted to the outer shell, the lever having a cam end bearing against the inner shell, and the lever being operable to vary the separation between the inner and outer shells.

42. A cooking utensil as defined in claim 41, wherein the cam end of the lever includes a plurality of flattened surfaces to allow the lever to remain in any one of various positions without being held.

43. A cooking utensil as defined in claim 41, further including:

means operatively connected to the inner shell and the outer shell for urging the inner shell away from the outer shell.

44. A cooking utensil as defined in claim 43, wherein the urging means includes a relatively stiff bellows.

45. A cooking utensil as defined in claim 43, wherein the urging means includes a series of leaf springs.

46. A cooking utensil as defined in claim 43, wherein the urging means includes a mass of conformable material.

47. A cooking utensil as defined in claim 2, wherein the thermal conductance varying means includes a thumb screw operatively connected to the inner and outer shells, the thumb screw being operable to vary the separation between the inner and outer shells.

48. A cooking utensil as defined in claim 47, wherein the thermal conductance varying means further includes:

a worm gear engagingly connected to the thumb screw; and a motor connected to the worm gear for rotating the worm gear and thumb screw.

49. A cooking utensil as defined in claim 1, further comprising:

a lid for covering the cooking utensil, the lid having an outer shell and an inner shell operatively connected in closely spaced-apart relation to the other shell to define a lid chamber therebetween, wherein the lid chamber is evacuated to a level sufficient to inhibit heat transfer by molecular conduction between the inner shell and the outer shell.

50. A cooking utensil as defined in claim 1, wherein said inner shell has a bottom surface and said outer shell has a bottom surface, and further including a plurality of spacers located within the chamber and positioned between the bottom surface of the inner shell and the bottom surface of the outer shell, said spacers being composed of a material that has lower heat conductance characteristics than either said inner shell or said outer shell.

51. A cooking utensil as defined in claim 50, wherein the spacers are composed of glass.

52. A cooking utensil as defined in claim 50, wherein the spacers are composed of ceramic.

53. A cooking utensil as defined in claim 50, wherein the spacers are each connected together in a web.

54. A cooking utensil as defined in claim 1, wherein the source of heat is a source of energy which transmits energy electromagnetically, heating the inner pot inductively, and further wherein the outer shell is composed of glass and the inner shell is composed of metal.

55. A cooking utensil as defined in claim 1, wherein the outer shell is metallic and has an upper edge and wherein the inner shell is metallic and has an upper edge and further wherein the two upper edges are welded together.

56. A cooking utensil as defined in claim 1, wherein the outer shell is metallic and has an upper edge and wherein the inner shell is metallic and has an upper edge and further wherein a relatively thin foil is welded to each of the two upper edges to connect the two upper edges together.

57. A cooking utensil as defined in claim 1, wherein the outer shell is metallic and has an upper edge and wherein the inner shell is metallic and has an upper edge and further wherein a flexible bellows is attached to each of the two upper edges to connect the two upper edges together.

58. A method for automatically cooking food with a cooking utensil which includes a mechanism for controlling heat transferred from an outer shell of the cooking utensil to an inner shell of the cooking utensil, comprising the steps of:

placing food in the inner shell;

exposing the outer shell to heat;

initiating the utensil to begin a predetermined cooking schedule; and controlling heat transferred from the outer shell to the inner shell in accordance with the predetermined cooking schedule by selectively disabling and enabling heat transfer capability between the outer shell and the inner shell.

* * * * *